(12) United States Patent
Zaggl et al.

(10) Patent No.: US 10,005,258 B2
(45) Date of Patent: Jun. 26, 2018

(54) LAYERED STRUCTURE WITH BARRIER LAYER, APPAREL PIECE WITH SUCH A LAYERED STRUCTURE AND PRODUCTION OF SUCH A LAYERED STRUCTURE

(75) Inventors: Alexander Zaggl, Feldkirchen-Westerham (DE); Helmut Klug, Poing (DE); Holger Zoudlik, Kolbermoor (DE)

(73) Assignee: W. L. Gore & Associates GmbH, Putzbrunn (DE)

( * ) Notice: Subject to any disclaimer, the term of this patent is extended or adjusted under 35 U.S.C. 154(b) by 1638 days.

(21) Appl. No.: 13/059,485

(22) PCT Filed: Aug. 28, 2009

(86) PCT No.: PCT/EP2009/006254
§ 371 (c)(1),
(2), (4) Date: Apr. 6, 2011

(87) PCT Pub. No.: WO2010/022968
PCT Pub. Date: Mar. 4, 2010

(65) Prior Publication Data
US 2011/0179549 A1    Jul. 28, 2011

(30) Foreign Application Priority Data

Aug. 29, 2008  (DE) .................. 10 2008 044 982

(51) Int. Cl.
*A41D 19/00*    (2006.01)
*B32B 7/14*    (2006.01)
(Continued)

(52) U.S. Cl.
CPC .......... *B32B 7/14* (2013.01); *A41D 19/01547* (2013.01); *A41D 31/02* (2013.01);
(Continued)

(58) Field of Classification Search
CPC .. A41D 19/0006; A41D 19/001; A41D 31/00; A41D 31/0011; A41D 31/02;
(Continued)

(56) References Cited

U.S. PATENT DOCUMENTS 3,657,389 A * 4/1972 Caldwell et al. ............. 525/176
3,953,566 A    4/1976 Gore
(Continued)

FOREIGN PATENT DOCUMENTS

GB    2176741 A  *  1/1987 ............. B29C 65/50
WO    1997/033921    9/1997

*Primary Examiner* — Jameson Collier
(74) *Attorney, Agent, or Firm* — Kilpatrick Townsend & Stockton, LLP

(57) ABSTRACT

A layered structure that includes at least a first layer and a second layer is provided. The second layer includes at least one barrier layer. A bonding substance is partially disposed between the barrier layer and the first layer to create a bond between the barrier layer and the first layer. The bonding substance contains a first component that has, at 25° C., a shear modulus of not more than $3 \times 10^5$ Pa in accordance with the Dahlquist criterion. The bonding substance may also contain a second component having adhesive characteristics. The first component also has a low viscosity such that a force (F) between the first and second layers which acts on at least one of the layers in a force action area is distributed by a plastic flow onto an area which is larger than the force action area.

26 Claims, 9 Drawing Sheets

Figure 1:
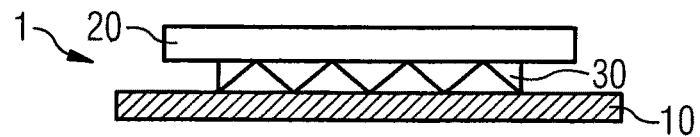

(51) Int. Cl.
*B32B 27/30* (2006.01)
*A41D 19/015* (2006.01)
*A41D 31/02* (2006.01)
*B32B 9/04* (2006.01)
*B32B 5/16* (2006.01)
*B32B 5/30* (2006.01)
*B32B 9/02* (2006.01)
*B32B 27/12* (2006.01)
*B32B 27/32* (2006.01)
*B32B 27/36* (2006.01)
*B32B 27/40* (2006.01)
*B32B 3/08* (2006.01)

(52) U.S. Cl.
CPC ............... *B32B 3/08* (2013.01); *B32B 5/16* (2013.01); *B32B 5/30* (2013.01); *B32B 9/025* (2013.01); *B32B 9/045* (2013.01); *B32B 9/048* (2013.01); *B32B 27/12* (2013.01); *B32B 27/308* (2013.01); *B32B 27/32* (2013.01); *B32B 27/322* (2013.01); *B32B 27/36* (2013.01); *B32B 27/40* (2013.01); *B32B 2255/04* (2013.01); *B32B 2260/025* (2013.01); *B32B 2264/0257* (2013.01); *B32B 2270/00* (2013.01); *B32B 2307/724* (2013.01); *B32B 2307/7242* (2013.01); *B32B 2307/7265* (2013.01); *B32B 2307/744* (2013.01); *B32B 2437/00* (2013.01); *B32B 2437/02* (2013.01); *Y10T 156/10* (2015.01); *Y10T 428/31504* (2015.04); *Y10T 428/31855* (2015.04)

(58) Field of Classification Search
CPC ............ A41D 19/015; A41D 19/01576; A41D 19/0065; A41D 31/0016; A41D 31/0061; A41D 2400/22; A41D 19/01547; Y10T 156/10; B32B 7/14; B32B 3/08; B32B 5/16; B32B 5/30; B32B 9/025; B32B 9/045; B32B 9/048; B32B 27/12; B32B 27/308; B32B 27/32; B32B 27/322; B32B 27/36; B32B 27/40
USPC .............................. 2/159, 164, 904; 442/289
See application file for complete search history.

(56) References Cited

U.S. PATENT DOCUMENTS

| | | | |
|---|---|---|---|
| 4,187,390 A | | 2/1980 | Gore |
| 4,194,041 A | | 3/1980 | Gore et al. |
| 4,430,759 A | * | 2/1984 | Jackrel .............. 2/159 |
| 4,493,870 A | | 1/1985 | Vrouenraets et al. |
| 4,514,460 A | * | 4/1985 | Johnson ............. A41D 19/0065 2/161.8 |
| 4,520,056 A | * | 5/1985 | Jackrel ............ 428/68 |
| 4,545,841 A | * | 10/1985 | Jackrel ............ 156/290 |
| 4,725,481 A | | 2/1988 | Ostapchenko |
| 4,865,903 A | * | 9/1989 | Adiletta ............ 428/215 |
| 5,260,360 A | * | 11/1993 | Mrozinski .......... B01D 67/0027 524/95 |
| 5,442,818 A | | 8/1995 | Loos |
| 5,628,067 A | * | 5/1997 | Meyer et al. ........ 2/125 |
| 5,655,226 A | * | 8/1997 | Williams .......... A41B 11/005 12/142 G |
| 5,740,551 A | * | 4/1998 | Walker .............. 2/16 |
| 5,822,795 A | * | 10/1998 | Gold .............. 2/159 |
| 6,297,309 B1 * | | 10/2001 | Bauduin et al. ........ 524/476 |
| 6,395,383 B1 * | | 5/2002 | Maples .......... 428/319.3 |
| 6,772,444 B2 * | | 8/2004 | Tremblay-Lutter ............ 2/164 |
| 6,811,338 B1 * | | 11/2004 | Manske, Jr. .......... A01N 25/34 15/104.94 |
| 6,869,900 B2 * | | 3/2005 | Wyner et al. ............. 442/136 |
| 7,178,171 B2 * | | 2/2007 | Griesbach, III ............ 2/161.7 |
| 7,284,283 B2 * | | 10/2007 | MacK et al. ............ 2/161.6 |
| 7,451,497 B2 * | | 11/2008 | von Blucher ............ 2/161.6 |
| 2001/0033988 A1 | | 10/2001 | Husemann et al. |
| 2004/0010217 A1 * | | 1/2004 | Blette et al. ............ 602/54 |
| 2004/0098786 A1 | | 5/2004 | Hottner et al. |
| 2005/0076418 A1 | | 4/2005 | von Blucher |
| 2005/0106971 A1 * | | 5/2005 | Thomas ............. A41D 31/0016 442/181 |
| 2006/0068140 A1 * | | 3/2006 | Flather ............. A41D 19/0065 428/36.1 |
| 2006/0156451 A1 | | 7/2006 | Klein et al. |
| 2007/0012397 A1 * | | 1/2007 | de Jong ............ A41D 31/0038 156/252 |
| 2007/0129697 A1 * | | 6/2007 | Soerens ............. A61L 15/24 604/366 |
| 2007/0172684 A1 * | | 7/2007 | Husemann ............. C09J 7/00 428/522 |

\* cited by examiner

FIG 5
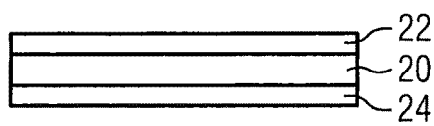
FIG 6
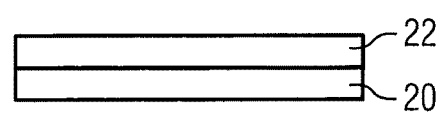
FIG 7
A.
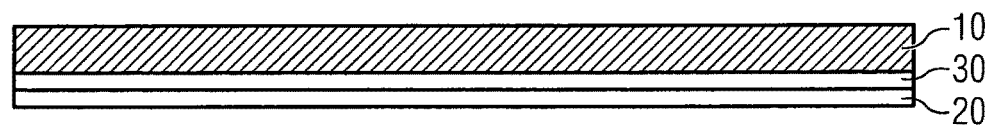
B.
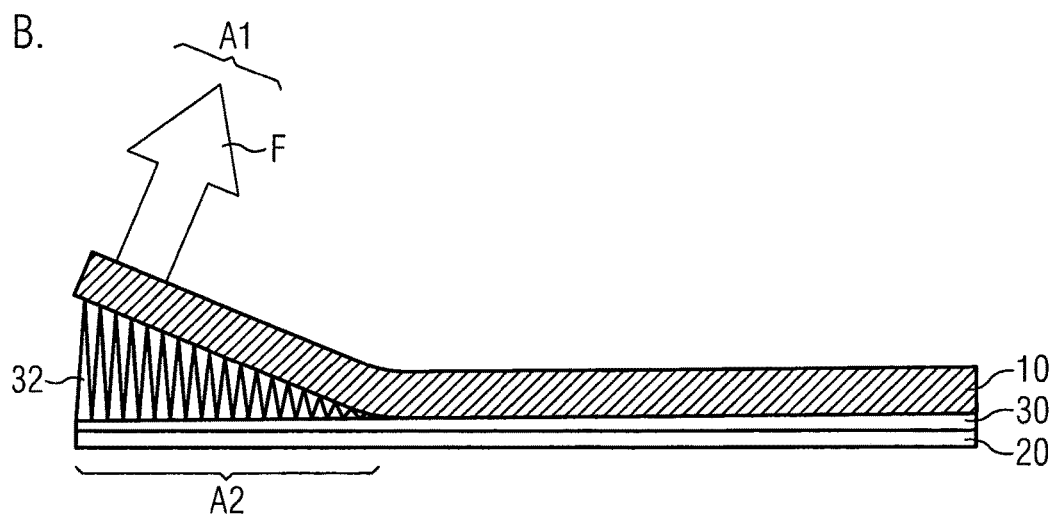

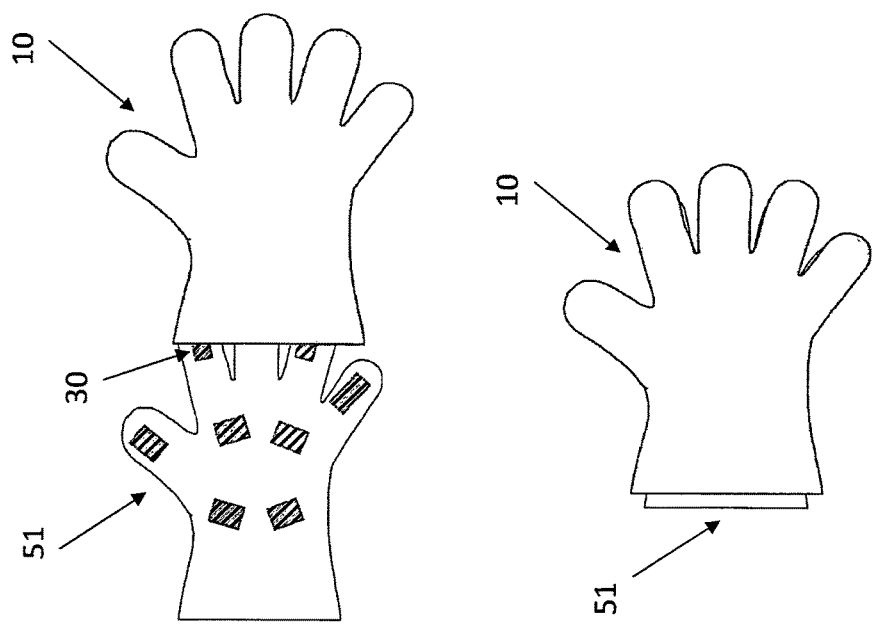
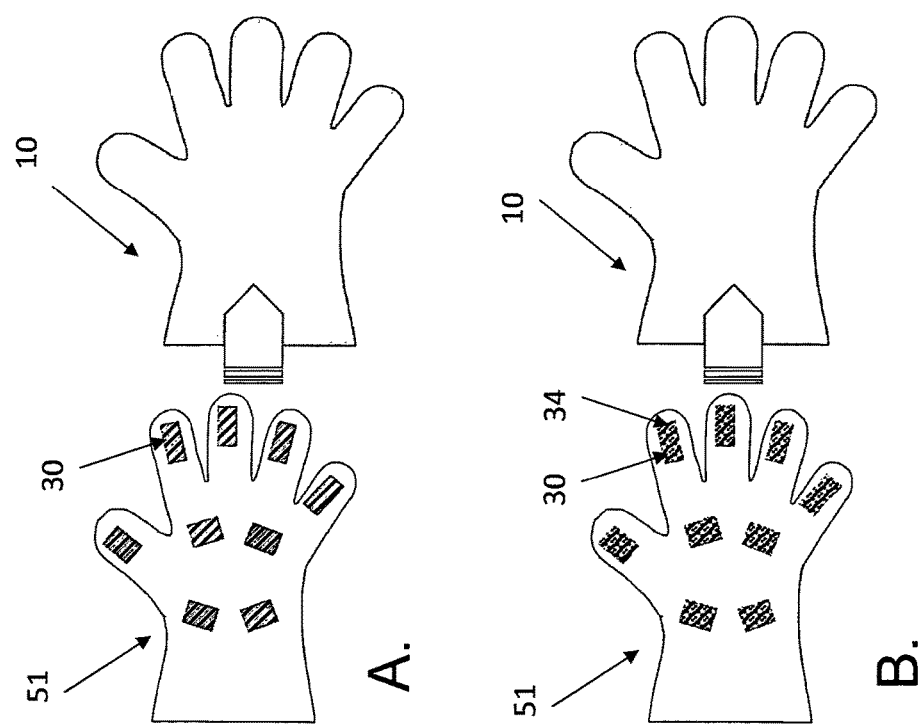
FIG 13

FIG 18

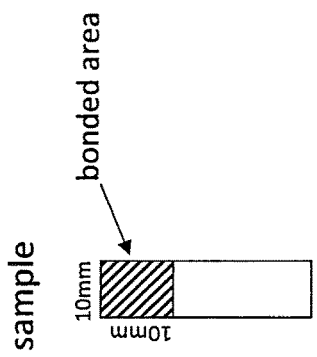

sample — bonded area (10mm × 10mm)

| adhesive | Peka 23877 | G 970 | 3M 950 | Peka 500 |
|---|---|---|---|---|
| kind | Hotmelt | PSA (pressure sensitive adhesive) | PSA | PSA |
| base | Polyolefine | Acrylate | Acrylate | SIS |
| Shear modulus at 25°C [×10⁴Pa] | — | 4,24 | 6,51 | 8,20 |
| Time to failure [s] | 1 | 200 | 7000 | 5000 |
| Failure mode | adhesive quickly released from one substrate or damaged the substrate | cohesive failure within the adhesive | cohesive failure within the adhesive | adhesive released from one substrate |

LAYERED STRUCTURE WITH BARRIER LAYER, APPAREL PIECE WITH SUCH A LAYERED STRUCTURE AND PRODUCTION OF SUCH A LAYERED STRUCTURE

The present invention relates to a layered structure, in particular for producing apparel, comprising at least a first layer and a second layer, the second layer including at least a barrier layer, and comprising a bonding substance disposed between the barrier layer and the first layer to create a bond between the barrier layer and the first layer. The present invention further relates to an apparel piece, in particular a glove, comprising such a layered structure. The present invention also relates to a process for producing such a layered structure.

The production of waterproof apparel, in particular waterproof gloves, has already been variously described in the prior art. One way this is achieved, for example, is with the aid of a waterproof lining or of a waterproof inner glove or inner part inserted into the outer material of the glove. In general, a waterproof and yet water vapor permeable, i.e., breathable, inner material is used to ensure additional wearing comfort. This waterproof inner material is generally also referred to as a barrier layer, as a functional layer or as a functional material. It can be fabricated, for example, from the barrier layer alone or from a multi-layer laminate comprising a barrier material and at least one textile layer. To enhance the wearing comfort on the skin, the interior of the glove is generally lined with a lining, or the inner textile layer of the laminate consists of such a lining material.

Typically, to achieve straightforward and economical production, this inner part is formed from two identical flat matching pieces of the barrier material or the laminate, which are bonded together waterproof along the circumferential margin. The inner part thus obtained typically has the two-dimensional shape of a hand with a certain addition to its dimensions.

The production of gloves equipped with such a waterproof and water vapor permeable functional layer is described in U.S. Pat. No. 5,442,818 A for example. In this reference, the barrier layer is adhered uniformly but semipermeably to the outside material of the glove to obtain a tactile glove. However, the fact that the barrier layer is adhered to the outside material uniformly is responsible for a certain stiffness on the part of the glove.

US 2006/0156451 describes the production of a glove wherein a slip-impeding substance, referred to as an anti-slip tape, is partially interposed between the layers of the outside material and of the inner part without adhering the layers together. Interlayer slippage is nevertheless prevented when, in the use of the glove, a normal force (for example pressure generated on wearing) is exerted on the layers and acts on the slip-impeding substance. The resulting increased stick friction between the layers on wearing the glove prevents interlayer slippage. The advantage here is that the flexibility of the glove is increased, or its stiffness distinctly reduced.

It is an object of the present invention to provide a layered structure of the abovementioned type particularly for apparel and an apparel piece which are notable for comparatively high flexibility coupled with good tactility and interlayer fixation.

In accordance with a first aspect of the present invention, the present invention comprises a layered structure, in particular for production of apparel, comprising at least a first layer and a second layer, the second layer including at least a barrier layer, and a bonding substance partially disposed between the barrier layer and the first layer to create a bond between the barrier layer and the first layer. The bonding substance includes at least one component of low viscosity such that a force, in particular a shearing force, between the first and second layers which acts on at least one of the layers in a force action area is distributed by a plastic flow onto an area which is larger than the force action area.

In accordance with a further aspect of the present invention, the present invention comprises a layered structure, in particular for production of apparel, comprising at least a first layer and a second layer, the second layer including at least a barrier layer, and a bonding substance partially disposed between the barrier layer and the first layer to create a bond between the barrier layer and the first layer. The bonding substance includes at least one component which is configured such that it has, at 25° C., a shear modulus of essentially not more than $3 \times 10^5$ Pa in accordance with the Dahlquist criterion.

In one embodiment, the at least one component has a shear modulus of not more than $10^5$ Pa.

This low-viscosity component of the bonding substance, having the comparatively low shear modulus, makes it possible to achieve a long-lastingly durable bond between the first and second layers, since forces arising in use between the first layer and the barrier layer of the layered structure are distributed away from the adhesive edge and over a larger area. It is, in particular, one property of the low-viscosity component of the bonding substance to create an adequate cohesive hold between the layers to achieve good fixation of the layers. At the same time, the low-viscosity component has the property of absorbing strains arising in use via plastic flow and thus of preventing damage to the barrier layer at the adhesive edge (so that the barrier function can no longer be ensured, as a result of tearing of the barrier layer out of the adhesive edge for example). Partial provision of the bonding substance also reduces the stiffness of the layered structure compared with a uniform adhesive bond. More particularly, the viscoelastic property of the bonding substance is so chosen that the force needed for deformation is below the fracturing force of the adherent barrier layer.

The term "partial" herein is to be understood as meaning that the bonding substance does not cover the entire surface area of the first and/or second layers. The bonding substance has only been placed on certain locations on the surface of the first and/or second layers.

In one embodiment of the present invention the bonding substance includes a further component, in addition to the at least one component, which further component has an adhesion property which differs from the at least one component. This makes it possible, as will be more particularly described herein below, to simplify the manufacture of an apparel piece. More particularly, the further component, which has little if any adhering effect during the manufacturing process at least, can be used to initially deactivate the low-viscosity component with regard to its adhesion property during the manufacturing process, for example in order that an exterior glove need not be inverted when the layer of the exterior glove is slipped over the barrier layer. Deactivating the low-viscosity component during the manufacture of an apparel piece ensures that the exterior glove does not adhere or stick to the barrier layer as it is being slipped over the barrier layer.

The adhesion property of the respective component is particularly evident in the initial tack. Tack is the force needed for an adhesive-coated material to be removed from a substrate after very brief contact. Softer pressure sensitive adhesives having a lower shear modulus are faster to wet the substrate and have a higher tack. Vice versa, pressure sensitive adhesives having a higher shear modulus have a lower tack. In accordance with one embodiment of the present invention, the further component has a lower tack than the low-viscosity component. Or, in other words, the shear modulus of the further component in accordance with one embodiment of the present invention is higher than that of the low-viscosity component (has in particular a shear modulus of greater than $3\times10^5$ Pa in accordance with the Dahlquist criterion).

In one development of the present invention, the adhesion properties of the at least one component and of the further component are activatable by the application of differing activation energies. For instance, the further component can be activated by pressure and/or heat, while the low-viscosity component is pressure activatable. Activatable in this context is to be understood as meaning that the adhesive effect of the low-viscosity component is activated, while there are two possible meanings in relation to the further component. In a first aspect, the further component is activated in order that it may change its consistency and, for example, penetrate into the first layer and/or into the low-viscosity component of the bonding substance. In this sense, the low-viscosity component acts openly with regard to its cohesive effect also in the direction of the other side, on the first layer. In a second aspect, the activation of the further component activates the adhesive effect of this component toward the first layer. As a result, the low-viscosity component acts adheringly on sides of the barrier layer, while the further component acts adheringly on sides of the first layer.

The low-viscosity component of the bonding substance is a pressure sensitive adhesive component for example. The pressure sensitive adhesive component may comprise an acrylate adhesive for example.

In a further embodiment, the further component is heat activatable, comprises in particular a heat-activatable hot-melt adhesive component, and has been applied to a side of the bonding substance which is remote from the barrier layer. The further component may in the widest sense constitute a substance comprising activation energy-activatable liquids, powders, films, structures. For example, the further component comprises or is a hot-melt adhesive or a wax, and may have been applied in various forms, as in powderlike, filmlike and/or liquid form.

In one embodiment, the barrier layer forms an outside layer of the second layer which faces the first layer. Especially in this case the low-viscosity component is directly or immediately applied to the barrier layer.

Barrier layer is to be understood as meaning in particular a film, a membrane or a coating which forms a barrier at least to air passage through this layer, ideally also with regard to further gases such as for example chemical poisonous gases. The barrier layer is water vapor permeable but air impermeable and/or gas impermeable. The barrier layer is referred to as air impermeable when it has an air transmission rate of less than 25 l/m², in particular embodiments an air transmission rate of less than 5 l/m² (EN ISO 9237, 1995).

In a further embodiment, the barrier layer additionally includes at least one barrier function to water passage, ideally also to further liquids. The barrier layer is liquid impermeable when it prevents the passage of water at a pressure of at least 0.13 bar (ISO 811).

The barrier layer in one embodiment includes at least one water vapor permeable and air impermeable membrane. In a further embodiment, the membrane is also liquid impermeable, at least water impermeable.

A water impermeable and water vapor permeable flexible membrane suitable for the present invention is described in U.S. Pat. No. 3,953,566 A, which describes a porous expanded polytetrafluoroethylene (PTFE) material. The expanded porous PTFE material has a characteristic microstructure of interconnected nodes and fibrils. The water impermeability of the membrane can be improved when the expanded PTFE material has been coated with a hydrophobic and/or oleophobic coating material.

The water impermeable and water vapor permeable membrane can also be constructed of a microporous material such as for example polyethylene or polypropylene, microporous polyurethane or polyester, or a hydrophilic monolithic polymer such as polyurethane for example.

Suitable materials for a waterproof and water vapor permeable barrier layer are in particular polyurethane, polypropylene and polyester, including polyether ester and laminates thereof, as described in U.S. Pat. No. 4,725,481 and U.S. Pat. No. 4,493,870. Particular preference, however, is given to expanded microporous polytetrafluoroethylene (ePTFE) as described for example in U.S. Pat. No. 3,953,566 and U.S. Pat. No. 4,187,390, and expanded polytetrafluoroethylene provided with hydrophilic impregnants and/or hydrophilic layers; see for example U.S. Pat. No. 4,194,041. A microporous barrier layer has an average pore size between about 0.2 µm and about 0.3 µm.

Pore size can be measured using a Coulter Porometer (brand name) from Coulter Electronics, Inc., Hialeath, Fla.

A barrier layer is considered water vapor permeable when it has a water vapor permeability number Ret of below 150 $m^2 \times Pa \times W^{-1}$. Water vapor permeability is tested according to the Hohenstein skin model. This test method is described in DIN EN 31092 (February 1994) or ISO 11092 (1993).

The layered structure of the present invention is particularly useful in the manufacture of a glove. The advantageous properties of the layered structure are particularly useful in this case because good layer fixation, for example between outside glove and inner glove to the membrane material of the barrier layer coupled with nonetheless low stiffness due to partial layer fixation is particularly advantageous for providing a waterproof glove possessing high tactility.

For example, the first layer forms an outside layer and the second layer forms an inner lining of the glove. On the other hand, it is also possible for the first layer to form an inner lining layer and for the second layer to form an outside layer of the glove. In yet another embodiment it is possible for the first layer and the second layer each to be part of an inner lining of the glove.

In one illustrative embodiment, the first layer forms an outside layer, in particular of leather, and the second layer forms an inner lining of the glove. In a further embodiment, the second layer, as well as the barrier layer, includes an inner liner layer, and the barrier layer is bonded to the inner liner layer, generally via its entire surface area, in a water vapor permeable (discontinuous) manner, on the side which is remote from the outside layer.

In a further development of the glove of the present invention, the glove includes a finger region and a thumb region and the bonding substance is disposed at least in the finger region and/or in the thumb region, in particular in a region of one or more finger tips and/or the tip of the thumb.

In accordance with a further aspect, a slip-impeding substance can be disposed between the first layer and the second layer in at least one further region of the glove, as will be more particularly elucidated with reference to the figure description. The bonding substance can be further disposed in a hand area region, in particular in the region of the knuckle, and configured in the form of a strip in particular.

For example, the bonding substance is at least in the finger region and/or in the thumb region disposed in stripe form transversely to a bending line on the glove. The bonding substance can be discontinuously distributed, for example in the form of dots, over the glove, in particular can occupy an area of less than half of the glove inside area or glove outside area.

The embodiments described above with reference to a glove are similarly also applicable generally to any apparel piece, examples being a head covering, shoes, pants or outerwear.

More particularly, the second layer may, in addition to the barrier layer, include a further layer, such as an inner liner for example, in which case the barrier layer is adhered to the further layer in an essentially uniform but water vapor permeable manner. In this case, the first layer can be for example an outside layer and the further layer part of an inner layer of the apparel piece.

In an embodiment in which the apparel piece is configured as head covering, the bonding substance is disposed in dots in a crest region of the head covering. However, to improve the degree of fixation it is also possible for the bonding substance to be distributed in stripe form in two or more stripes along the circumference of the head covering, in particular, in a plan view of the head covering, in star form along the circumference. All further forms of fixation are similarly possible.

In a further aspect of the present invention, a process for producing a layered structure, in particular for producing apparel, comprises the steps of providing a first layer and a second layer, the second layer including at least a barrier layer, and providing a bonding substance comprising at least a first component on a first side of the bonding substance and a second component on a second side of the bonding substance that is opposite the first side, the first component being configured such that it has, at 25° C., a shear modulus of not more than $3 \times 10^5$ Pa in accordance with the Dahlquist criterion. In a further step, the bonding substance is partially applied on its first side to the second layer and at least one first activation energy is exerted in order that the first component, on the first side of the bonding substance, may form a bond with the second layer. In a further step, the first layer and the second layer are brought together in their respective end positions, the bonding substance being disposed between the first and second layers. In a further step, at least one second activation energy is exerted onto the second side of the bonding substance in order that the second component may penetrate into the first layer and/or into the bonding substance, so that the first component, on the second side of the bonding substance, may form a bond with the first layer. Alternatively, the at least second activation energy can be exerted onto the second side of the bonding substance in order that the second component may form a bond with the first layer.

It is envisioned in particular that the second component eliminates or at least reduces any cohesive effect of the first component on the second side of the bonding substance before the exerting of the second activation energy in order that the first layer and the second layer may be brought together more easily.

For example, the first component is a pressure sensitive adhesive component and the step of exerting first activation energy involves exerting pressure on the bonding substance in order that the pressure sensitive adhesive component, on the first side of the bonding substance, may form a bond with the second layer.

In a further embodiment, the second component is a heat-sensitive component, in particular a heat-activatable hot-melt adhesive component, and the exerting of the at least one second activation energy involves the exerting of heat (combined with pressure for example) on the heat-sensitive component.

The second component, for example in the form of a hot-melt adhesive, is disposed at least partly in powderlike, filmlike and/or liquid form on the second side of the bonding substance before the exerting of the second activation energy. On activation of the second component, the hot-melt adhesive penetrates into the low-viscosity component and/or into the first layer or breaks up in its consistency, so that the low-viscosity component forms a bond with the first layer also when the layers are brought together. Therefore, complicated inverting of, for example, an outer glove which encompasses the first layer is no longer necessary.

Further developments and refinements of the present invention are indicated in the subsidiary claims.

The invention will now be more particularly described with reference to illustrative embodiments in conjunction with the figures of the drawing.

Figure 2:
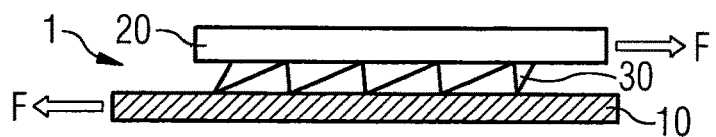
Figure 3:
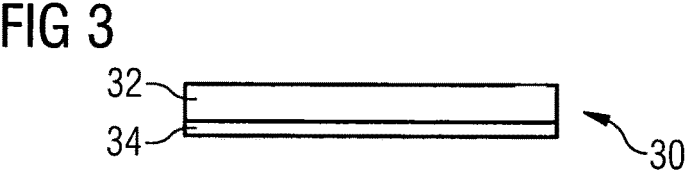
Figure 4:
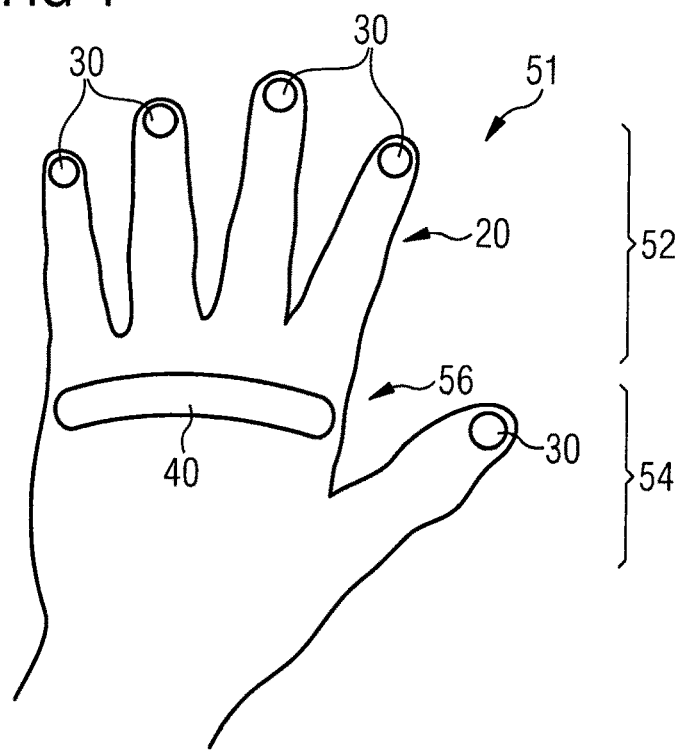
Figure 8:
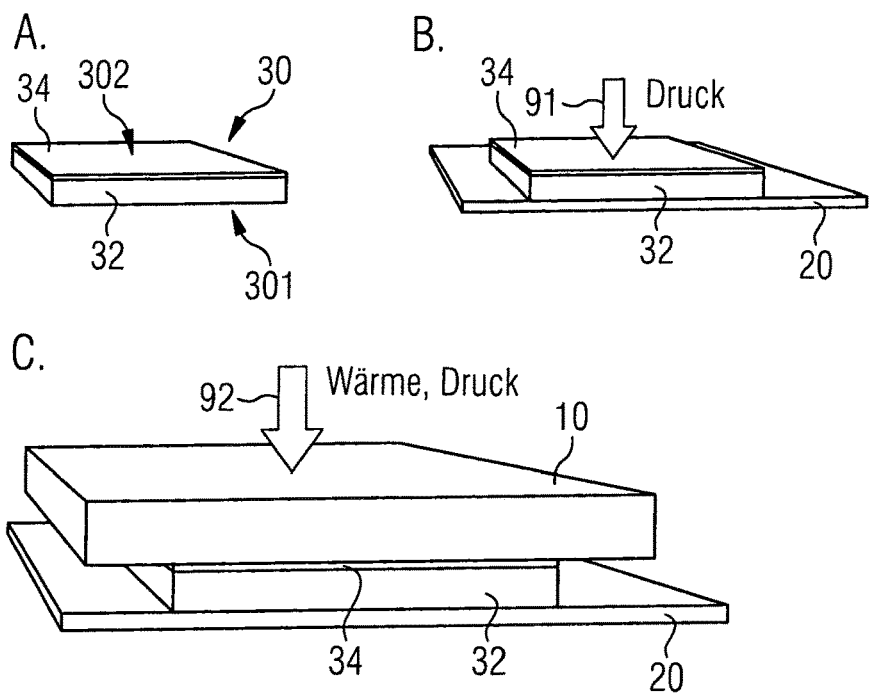
Figure 9:
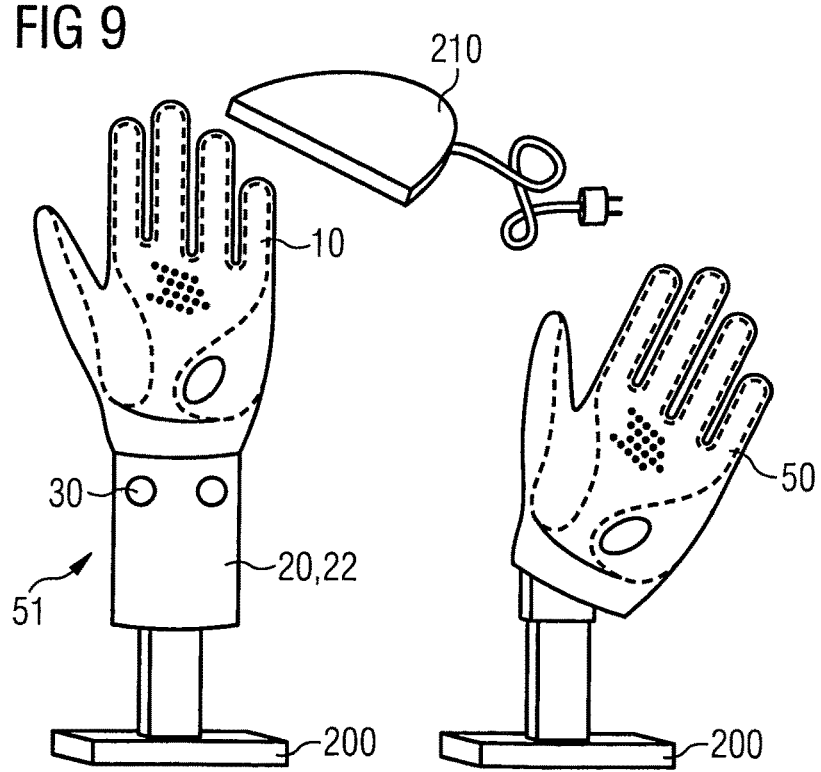
Figure 10:
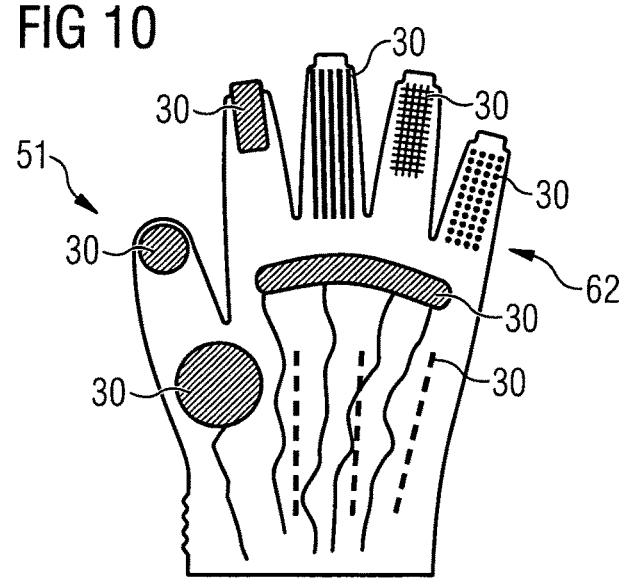
Figure 11:
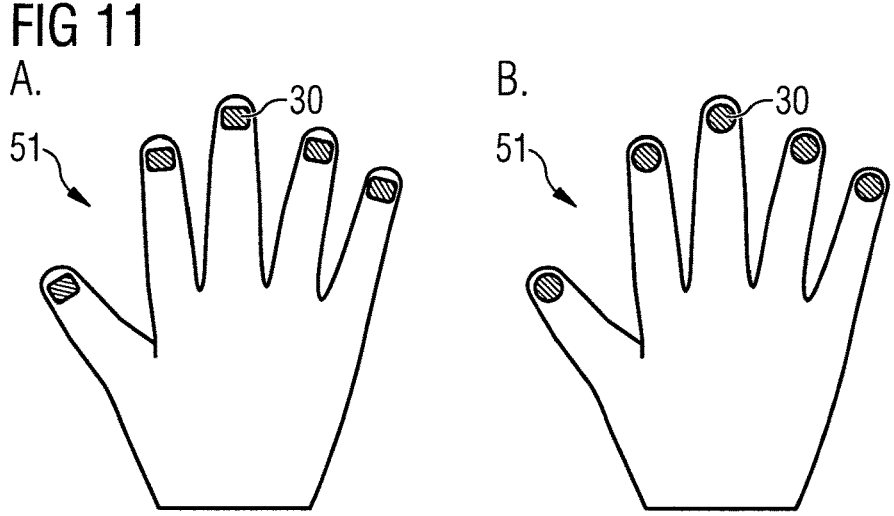
Figure 12:
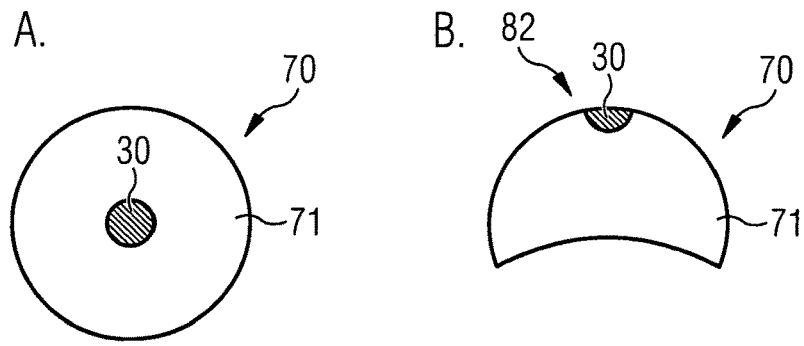
Figure 14:
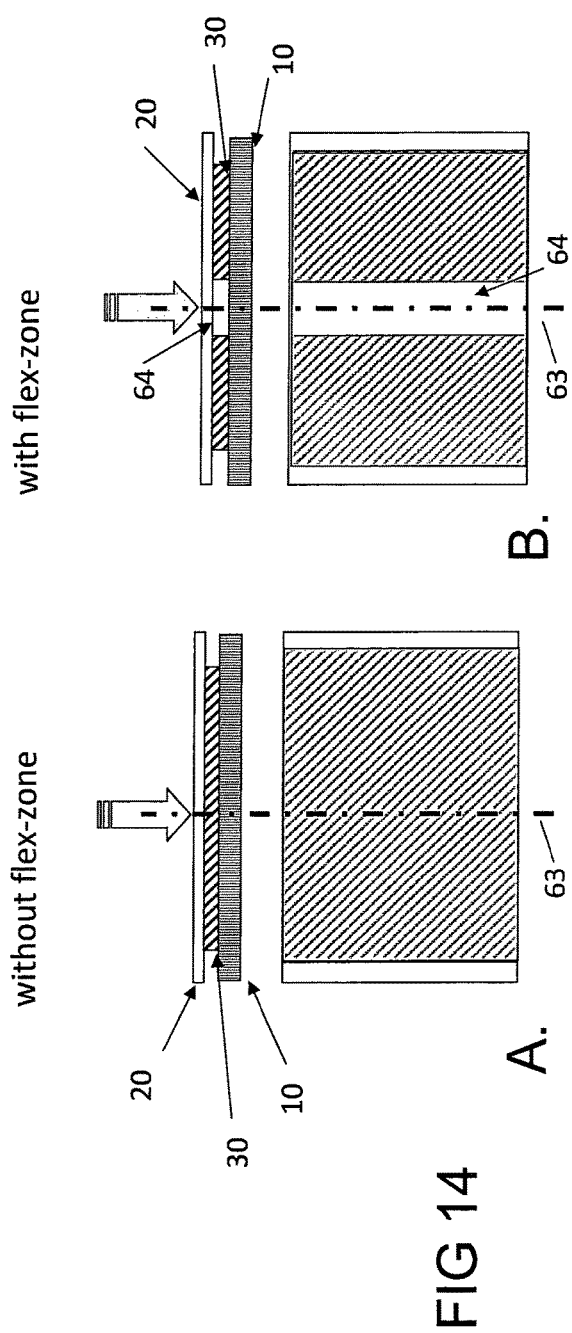
Figure 15:
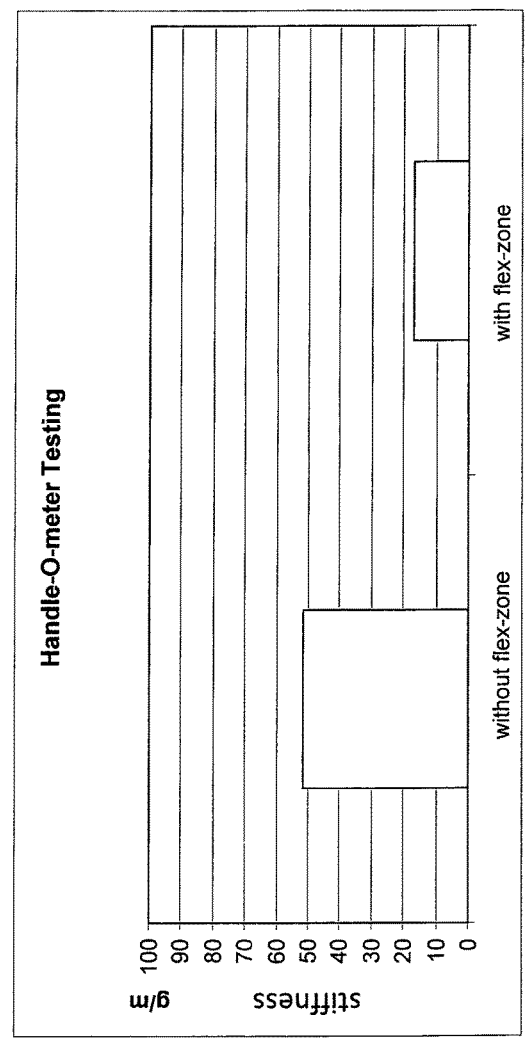

FIG. 1 shows a schematic cross-sectional view of a layered structure in accordance with an embodiment of the invention, FIG. 2 shows a schematic cross-sectional view of the layered structure as per FIG. 1 under influence of a force between the layers, FIG. 3 shows a schematic cross-sectional view of an embodiment of a bonding substance disposed between the layers in accordance with FIGS. 1 and 2, FIG. 4 shows a schematic plan view of an embodiment of an inner glove which partially includes the bonding substance of FIG. 3, FIG. 5 shows a schematic cross-sectional view of an embodiment of a layer of the present invention's layered structure which includes a barrier layer, FIG. 6 shows a schematic cross-sectional view of a further embodiment of a layer of the present invention's layered structure which includes a barrier layer, FIG. 7 shows in respective schematic cross-sectional views the function and mode of action of a bonding substance disposed between two layers of a layered structure according to the present invention, FIG. 8 shows in several schematic views various production steps in a production process following an embodiment of the invention, FIG. 9 shows a schematic view with regard to a plurality of production steps in the production of a glove in accordance with an embodiment of the invention, FIG. 10 shows a schematic plan view of a further embodiment of an inner glove in accordance with the present invention, FIG. 11 shows a plurality of schematic plan views of further embodiments of an inner glove in accordance with the present invention, FIG. 12 shows a schematic plan and side view of an embodiment of a head covering which includes a layered structure of the present invention, FIG. 13 shows a manufacturing process without use of an additional component in the bonding substance (FIG. 13A), and with use of an additional bonding substance (FIG. 13B), FIGS. 14, 15 show embodiments of exemplary layer arrangements with different amount of flexibility, and further demonstrates that "flex zones" can be created by applying adhesive in strategically favourable locations in the glove.

Figure 16:
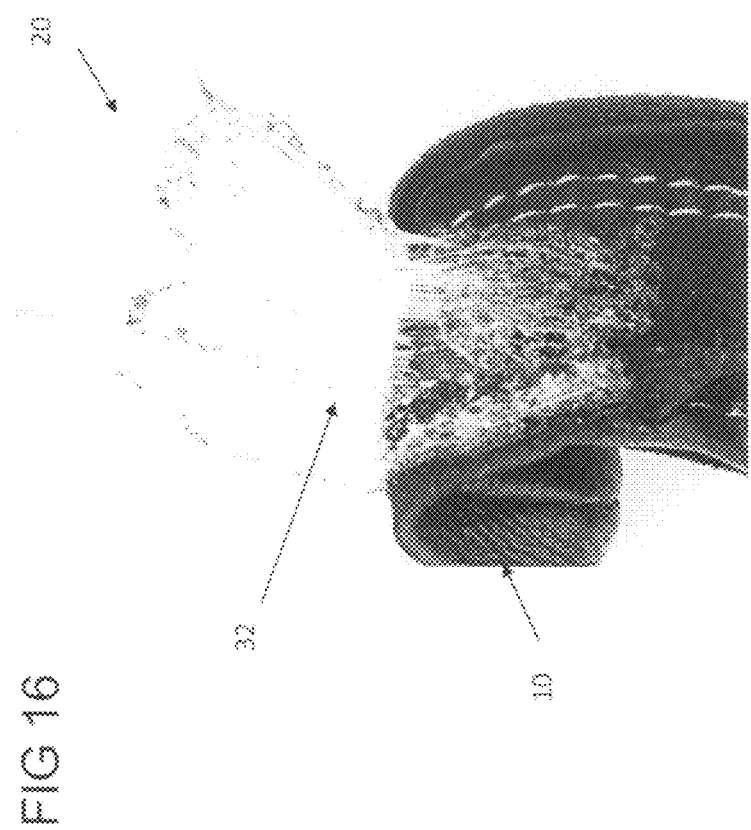
Figure 17:
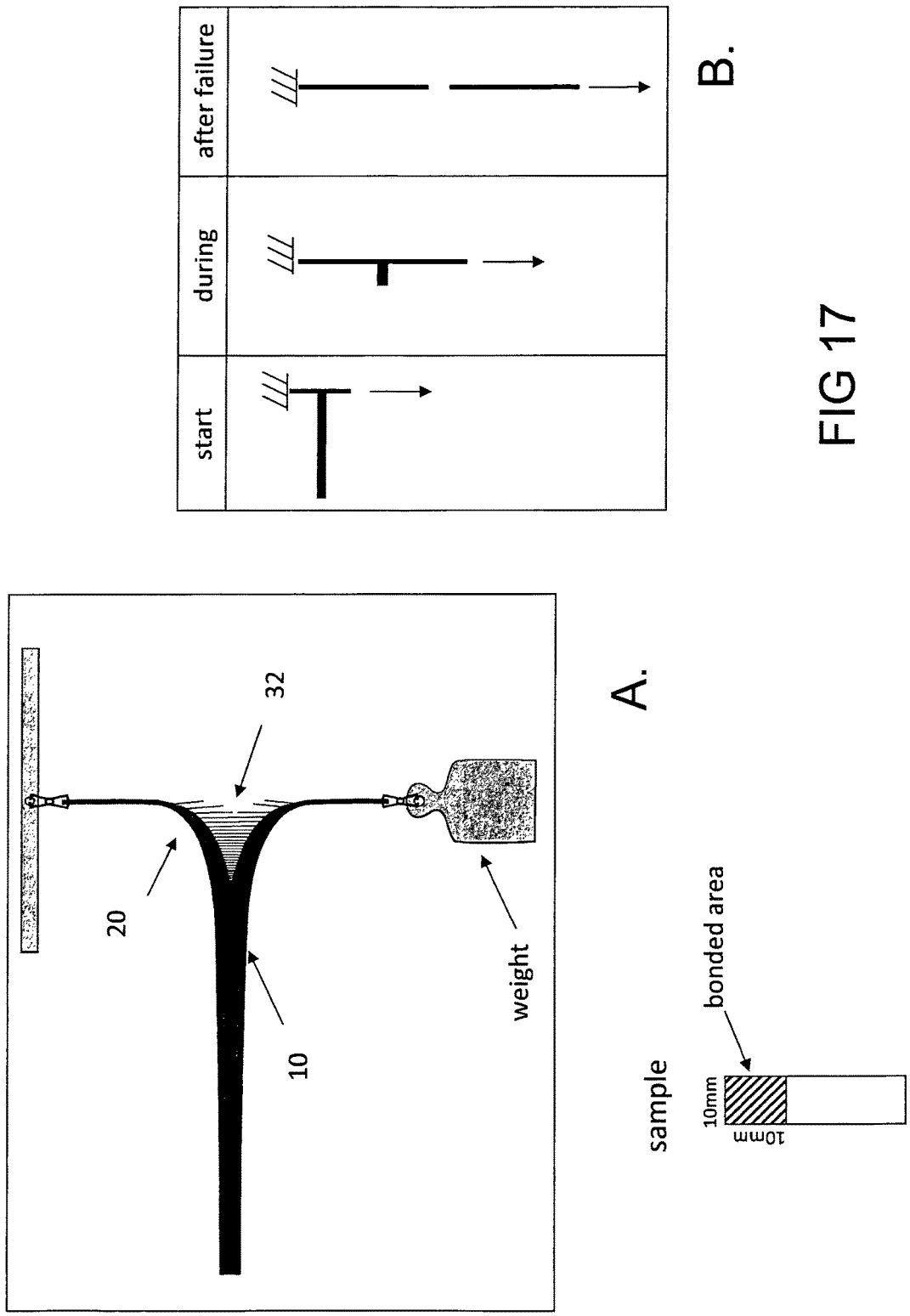

FIG. 16 shows an example of a layer arrangement in which an attempt is made to detach an outer layer from the barrier layer, FIG. 17 shows a test arrangement for testing the creep capability of exemplary embodiments of a bonding substance, FIG. 18 shows results of a testing method according to the principles as described with reference to FIG. 17.

FIG. 1 shows a schematic cross-sectional view of a layered structure in accordance with an embodiment of the present invention, useful for example in the manufacture of an apparel piece in the form of a glove for example. The layered structure 1 in the present embodiment includes a first layer 10 and a second layer, the second layer comprising, or being formed by, a barrier layer 20 at least. In the present case, the second layer is shown only as the barrier layer 20 in the form of a membrane (an ePTFE membrane for example) or in the form of a multilayered laminate with a membrane, which, depending on performance requirements and intended use, can be bonded, uniformly or partially, to at least one further layer, for example a textile layer. Accordingly, the second layer may comprise just a barrier layer 20 or a layered composite of two or more layers wherein one of these layers forms the barrier layer 20 and one other of these layers is for example a textile layer, for example on the reverse side of the barrier layer. The first layer 10 may comprise for example an outside layer, for example in the form of a piece of leather or in the form of a textile layer. The first layer 10 can be formed as a layer with a single layer or as a multilayered layer. It can be one-pieced or multi-pieced. For example, the outside layer 10 forms the outer layer or outer material of a glove, whereas the barrier layer 20, optionally with an inner textile layer for example, forms an inner material or lining of the glove.

The barrier layer 20 includes in particular an air impermeable water vapor permeable membrane, or forms such an air impermeable water vapor permeable membrane. In a further embodiment, the air impermeable water vapor permeable membrane is likewise waterproof.

Providing the barrier layer 20 makes it possible to achieve a broader protective function for the layered structure 1, so that the layered structure can be used to achieve a, for example, waterproof apparel which, owing to its water vapor permeability, has a high wearing comfort nonetheless.

Between the first layer 10 and the barrier layer there is disposed a bonding substance 30, albeit only partially between the barrier layer 20 and the first layer 10, i.e., not uniformly on the first layer 10 and the barrier layer 20.

Uniformly disposed in the present context is to be understood as meaning in particular that a bonding substance is disposed over the entire or substantially entire surface area. This can mean, for example, that a bonding substance (which may be water vapor permeable) is disposed continuously or in layerlike fashion over the entire or substantially entire surface area. In accordance with another embodiment this means that a bonding substance is distributed (in relatively small dots for example) discontinuously (water vapor permeably), yet essentially evenly and close-meshed over the entire or substantially entire surface area. A discontinuous adhesive bond of this kind is essentially comparable in terms of its adhesion, on the basis of its planar and close-meshed structure, with a continuous, layerlike adhesive bond, but has adhesive-free interstices which ensure a certain water vapor permeability even when a conventional adhesive is used.

Partially, however, is to be understood in the present context as meaning that the bonding substance is disposed only at concentrated, discrete points on the surface. This means, conversely, that other, in particular comparatively large, coherent regions of the surface are not covered by the bonding substance. The bonding substance is applied, for example, as a rectangle, as dots (relatively large dots) or in some other form, so that the bonding substance does not cover the surface area of the first and/or second layers uniformly. The bonding substance is only located at certain, in particular, strategic, locations on the surface area of the first and/or second layers. For example, the bonding substance can cover less than half of the entire surface area.

For example, in the case of partial adhesive bonding, the bonding substance is distributed unevenly over the surface area, in particular in comparison to the above-described uniform adhesive bonding with discontinuous application of adhesive. The partially applied bonding substance can be distributed at strategic locations locally, continuously, or discretely, as for example in small dots or in a netlike fashion. In the latter case, the bonding substance may be disposed in discrete distribution at the strategic locations, forming respective local clusters. For example, it is possible for two or more dots together to form a strategic adhesive-bond location in the form of a dotlike cluster or other kind of cluster.

In the case of partial adhesive bonding, the bonding substance may also be distributed largely evenly over the surface area; the adhesive-bond locations or adhesive-bond clusters are, in comparison to uniform adhesive bonding with discontinuous application of adhesive, at an essentially further distance from one another, forming comparatively large, coherent regions which are not covered with the bonding substance, and in general have comparatively large dimensions—for instance, in the case of circular or dotlike disposition, two or more millimeters in diameter, or, in the case of disposition in stripes or rectangles, two or more millimeters in length and/or width per adhesive-bond location or adhesive-bond cluster.

The bonding substance 30 serves to create a bond between the barrier layer 20 and the first layer 10 at partial locations of the layered structure, in particular for partial adhering together of the barrier layer 20 and the first layer 10. The bonding substance 30 includes a low-viscosity component which, in a first embodiment as per FIG. 3, is embodied as a low-viscosity adhesive component 32 and faces the barrier layer 20. This low-viscosity adhesive 32 makes it possible to achieve a long-lastingly durable bond, since forces arising in use between the first layer 10 and the barrier layer 20 of the layered structure 1 are distributed away from the adhesive edge and over a larger area. It is, in particular, one property of the low-viscosity adhesive 32 to create an adequate cohesive hold to maintain interbonding of the fixed layers. At the same time, the adhesive 32 has the property of absorbing strains arising in use via plastic flow and thus of preventing breakage at the adhesive edge.

FIG. 2 depicts by way of example how a force F (shearing force F) acts on the barrier layer 20 and the layer 10 in the course of wearing the glove for example. It may happen, for instance, that a hand being inserted into the glove catches the barrier layer at individual locations with its fingers, so that in this case a force F acts on the barrier layer 20 and causes the latter to move away from the layer 10.

FIG. 7 schematically shows a comparable case in which an attempt is made to detach the layer 10 from the barrier layer 20. In accordance with FIG. 7A, the layer 10 and the barrier layer 20 are bonded, in particular adhered, to each other via the bonding substance 30. As depicted by FIG. 7B, a force F acting on the layer 10 causes the latter to become partly detached from the barrier layer 20. However, the bonding substance 30 has the property of absorbing, via plastic flow, the strain which the force F creates on the layer 10, and thus of preventing any damage at the adhesive edge. In the present case, the force F acts on the layer 10 over a comparatively small force action area A1, as may arise for example as the result of the strain imposed by a hand being inserted into a glove. However, the low-viscosity adhesive 32 has the property that the force F between the layer 10 and the barrier layer 20 acting via the force action area A1 on the layer 10 is distributed by plastic flow of the adhesive 32 over an area A2 which is larger than the force action area A1. In this way, damage such as for example rupture of the barrier layer 20 or a detachment of the adhesive is avoided. In addition, the plastic deformation absorbs energy, reducing any strain on the barrier layer.

In FIG. 16, another example of a layer arrangement is shown in which an attempt is made to detach the layer 10 from the barrier layer 20. FIG. 16 shows the process in a more realistic depiction, wherein it is shown that the bonding substance has the property of absorbing, via plastic flow (creep), the strain which the detaching force creates on the layer 10, and thus of preventing any damage at the adhesive edge. [Creep is defined (ASTM D2990) as the permanent deformation resulting from prolonged application of stress below the elastic limit. Creep is influenced by the magnitude of the load, the time the load is applied, and the temperature.] However, the low-viscosity adhesive 32 has the property that the detaching force between the layer 10 and the barrier layer 20 is distributed by plastic flow of the adhesive 32 over an area which is larger than the force action area of the detaching force.

By contrast, forces arising between the layers can, when a high-viscosity adhesive is used, lead to a direct force introduction at the adhesive edge and consequently to damage or to be more precise to rupture of the barrier layer 20 or to detachment of the adhesive, in particular in the case of only partial adherence of the layer 10 to the barrier layer 20. In the case of uniform adherence, by contrast, these forces are distributed over a larger area and thus minimized. However, uniform adherence of the layer 10 to the barrier layer 20 results in a considerable increase in the stiffness of the layered structure, leading to reduced wearing comfort of the glove.

According to the present invention, therefore, only partial adherence reduces the stiffness of the layered structure significantly; on the other hand, however, use of a low-viscosity adhesive between the layers coupled with only partial adherence of the layers creates a long-lastingly durable bond and prevents any damage such as for example rupture of the barrier layer in use. It is thereby possible to produce a flexible, high-tactile glove in particular.

To achieve the properties described, the low-viscosity component of the bonding substance has, at 25° C., a shear modulus of not more than $3 \times 10^5$ Pa in accordance with the Dahlquist criterion. In one embodiment, the low-viscosity component has a shear modulus of not more than $10^5$ Pa. One property of the substance, reflected in this shear modulus, is adequate cohesive strength to maintain interbonding of the fixed layers. At the same time, the substance has the property of absorbing force spikes arising due to strains in use via plastic flow and cavitation through deformation. In one embodiment, the low-viscosity component can be embodied as an adhesive, and ensures adequate cohesive strength to long-lastingly bond together the layers of an apparel piece in the targeted temperature range in the particular use and the associated strains, in particular in response to shearing forces arising between the layers. At the same time, the adhesive used is capable of absorbing strains which arise between the layers primarily as a result of shearing forces in the arising temperature range in response to the arising forces corresponding to the particular use. For this purpose, the adhesive has as a virtue of its low shear modulus the property of plastic flow whereby the strain-induced forces on either or both layers are absorbed and transferred to a larger area. As a result, any damage to the barrier layer and any delamination of the layers can be long-lastingly avoided. The Dahlquist criterion says in particular that a material having a shear modulus of not more than $3 \times 10^5$ Pa has the specific properties described.

A test method for determining the shear modulus includes the following components and ambient influences:

Instrument: TA Instrument ARES LS-2, model #4×517212 (TA Instruments, New Castle, Del., www.tainstruments.com)

Method: 8 mm disks are die cut out of layers of adhesive. For the Gerband adhesive, the adhesive was removed from the strip or tape to prevent any contamination from the reinforcing element.

Parallel plates
Diameter=8.00 mm
Dynamic temperature ramp
Frequency=10.0 rad/s
Initial temperature=25° C.
Final temperature=−100.0° C.
Ramp rate=5.0° C./min
Strain=0.1%
Autotension adjustment=on
Mode=application of a constant static force
Autotension direction=compression
Initial static force=1.0 g
Autotension sensitivity=10.0 g
When sample modulus <=$1.00e^{+06}$ Pa
Autostrain=on
Max. applied tension=20.0%
Max. allowed moment=1000.0 g-cm
Min. allowed moment=1.0 g-cm
Strain adjustment=20.0% of current strain Especially the following adhesives of low shear modulus are useful as low-viscosity component of the bonding substance (Table 1):

| | | Thickness | | Shear modulus [Pa] | | | Use range as per data sheet |
|---|---|---|---|---|---|---|---|
| Designation | Type | [mm] | Basis | −20° C. | 0° C. | 25° C. | [° C.] |
| Peka 500 | tape | 0.25 | SIS (synthetic rubber) | $1.57 \times 10^7$ | $5.25 \times 10^5$ | $8.20 \times 10^4$ | −20 to 60 |

-continued

| Designation | Type | Thickness [mm] | Basis | Shear modulus [Pa] -20° C. | 0° C. | 25° C. | Use range as per data sheet [° C.] |
|---|---|---|---|---|---|---|---|
| 3M 950 | tape | 0.13 | modified acrylate | $1.82 \times 10^8$ | $1.16 \times 10^6$ | $6.51 \times 10^4$ | / |
| Gerband 970 | tape | 0.25 | emulsion acrylate | $1.50 \times 10^7$ | $2.60 \times 10^5$ | $4.24 \times 10^4$ | −30 to 100 |

Accordingly, one embodiment of the present invention can utilize a pressure sensitive adhesive component (component 32 in the bonding substance 30 of FIG. 3) which contributes to creating a bond between the barrier layer 20 and the layer 10. A pressure sensitive adhesive material is useful for this for example. More particularly, the pressure sensitive adhesive component comprises an acrylate adhesive.

FIG. 4 shows a schematic plan view of an embodiment of an inner glove 51 which includes a barrier layer 20 and forms part of a glove, as will be more particularly described with reference to FIG. 9. To manufacture a glove (not shown in FIG. 4), an outside layer or an outside glove of leather for example is pulled over the inner glove shown.

FIG. 5 shows an exemplary inner lining with the barrier layer 20 schematically in cross section. The barrier layer 20 is embedded between and bonded to two textile layers 22, 24 to form a multi-layer laminate. One textile layer 22 forms the inner liner layer and the further textile layer 24 forms a protective layer for the barrier layer, in particular in the case where the barrier layer is a membrane.

FIG. 6 depicts a further embodiment of an exemplary inner lining with the barrier layer 20 schematically in cross section. Here the barrier layer 20 is part of a laminate and bonded, for example adhered, to the textile layer 22 in a water vapor permeable manner. The textile layer 22 forms an inner liner layer of the glove and is optionally equipped with or connected to an additional insulant.

In another embodiment, however, the first layer 10 forms an inner lining layer and a second layer combines with the barrier layer 20 to form an outside layer for the glove. In this case, the barrier layer 20 is bonded on the inside to the layer 10. The second layer may in turn have a construction as per FIG. 5 or FIG. 6. A textile or leather layer 22 adhered, for example uniformly, to the barrier layer 20 can form the outer material of the glove.

In accordance with another embodiment, the first layer 10 and the second layer combined with the barrier layer 20 and optionally at least one textile layer 22 are each part of an inner lining of the glove.

As schematically depicted in FIG. 4, the inner glove 51 includes a finger region 52 and a thumb region 54. The bonding substance 30 is disposed at least in the finger region 52 and/or in the thumb region 54, in particular in a region of one or more finger tips and/or of the tip of the thumb. This makes it possible to manufacture a glove wherein the inner lining is sufficiently fixed with the barrier layer 20 in the outside layer 10 while at the same time the tactility of the glove is good and its stiffness is substantially reduced. Further locations decisive for the particular planned use can likewise be provided with the bonding substance 30 in accordance with the present invention depending on the use scenario in order that the outside layer 10 may be bonded to the barrier layer 20 of the inner lining.

In another embodiment, depicted in FIG. 4, only the finger tips of the glove are finished with the bonding substance 30, other regions however with a slip impeding substance 40, disposed between the outside layer 10 and the inner lining with the barrier layer 20. The slip impeding substance is for example adhered or otherwise bonded to one of the layers. This slip impeding substance has for example a composition and properties as described in US 2006/0156451 A1. The slip impeding substance does not adhere the two mutually adjoining layers to each other, but raises essentially only the stick friction between the two layers when the layers are pressed against each other (for example in the course of the exertion of a normal force on one of the layers as the glove is being worn). When the slip impeding substance is disposed between the outside layer 10 and the barrier layer 20, the relative movement between these layers during the wearing of the glove can thereby be controlled, which enhances the tactility of the glove. More particularly, materials as described in Tables 1 to 5 of US 2006/0156451 A1 can be used for this purpose. Altogether, a glove with an inner glove 51 which, in accordance with FIG. 4, is equipped with a strip 40 of slip impeding material in a hand surface region 56 for example, can possess good tactility coupled with substantially reduced stiffness.

A process for producing a layered structure 1 will now be described with reference to FIG. 8. How the process can be used to produce a glove 50 in particular is described in connection with FIG. 9.

In the processing of a layered structure which has been provided with the bonding substance, it is advantageous for the low-viscosity component 32 of the bonding substance to have a further component 34 applied to it, as schematically depicted in a cross section in FIG. 3 and in a perspective view in FIG. 8A. According to FIG. 8A, the low-viscosity component 32 is embodied as a pressure-sensitive adhesive (PSA) and disposed on a first side 301 of the bonding substance 30, whereas the further component 34 is applied as a hot-melt adhesive (HMA) on a second side 302 of the bonding substance 30, which is opposite the first side 301.

The low-viscosity component 32 has a consistency and properties as described above in relation to FIGS. 1 to 6. As depicted in FIG. 8B, the bonding substance 30 is applied partially on its first side 301 onto the barrier layer 20. The barrier layer may include for example an ePTFE membrane or a multilayered laminate with an ePTFE membrane. Further possible embodiments of barrier layers are more particularly described hereinbelow. In the present example, the bonding substance 30 is directly applied with the low-viscosity adhesive 32 to the membrane 20. To this end, at least one first activation energy is exerted in order that the adhesive 32 forms a bond with the membrane 20 on the first side 301 of the bonding substance 30. When a pressure sensitive adhesive 32 is used, pressure 91 in particular is exerted on the adhesive 32 in order that the latter may become adhered to the membrane 20.

The second component of the bonding substance in the form of the hot-melt adhesive 34 is embodied such that it initially eliminates or at least reduces any adhesive effect of the low-viscosity adhesive 32 on the second side 302 of the bonding substance 30 (the adhesive effect is blocked). This permits a comparatively straightforward bringing together of the layer 10 and of the barrier layer 20 with already applied bonding substance 30. In other words, a second component applied to the low-viscosity adhesive permits simplified processing and stops the low-viscosity adhesive 32 from adhering to the layer 10 in an unsuitable position as the layer 10, for example in the form of an outside glove, is pulled over the barrier layer 20.

This second component can be applied in various ways (in layered form for example) and include various materials, for example hot-melt adhesive or wax. Furthermore, the component 34 can have various forms. For example, the second component 34 is at least partly disposed in powderlike, filmlike and/or liquid form on the second side 302 of the bonding substance 30. Preference is given to using a very fine granular powder, which is applied thinly to the tacky surface of the low-viscosity adhesive 32. This initially eliminates or at least distinctly reduces any adhesive effect of the low-viscosity adhesive 32 on the second side 302 of the bonding substance 30. A layer moving past the side 302 thus does not get caught on or remain adhering to the bonding substance.

In this way, the second component 34 may be seen as a sacrificial component or processing aid, since it helps in manufacturing the glove as set out above, but does not substantially contribute to the final bonding connection between the layers as set out above.

In a subsequent manufacturing step as per FIG. 8C, the layer 10 and the barrier layer 20 are brought into their respective final positions relative to each other with the interposed bonding substance 30 adhered to the barrier layer 20. Then, at least one second activation energy is exerted on the second side 302 of the bonding substance 30. When a heat-activatable hot-melt adhesive is used as second component 34, heat and pressure 92 is exerted on the bonding substance 30. The heat 92 is effective in activating the hot-melt adhesive 34. As a consequence, the hot-melt adhesive 34 penetrates into the first layer 10 and/or into the bonding substance 30, i.e., into the low-viscosity adhesive 32, so that the low-viscosity adhesive 32 also forms a bond with the layer 10 on the second side 302 of the bonding substance 30. In other words, the second component 34 is in this case a processing aid for the layer 10 to be brought together with the barrier layer 20 and after activation (exertion of heat and pressure) of the second component 34 to be adhered with the low-viscosity adhesive 32.

More particularly, suitable activation changes the processing aid in its consistency (in that the hot-melt adhesive liquefies) in order that the layer 10 may be bonded to the barrier layer 20. The powder used for this is preferably a hot-melt adhesive having a low melting temperature. Heating lowers the viscosity of the powder and it then penetrates into the layer 10 and/or is partly taken up by the low-viscosity adhesive 32. The employment of pressure in the adhesive joint serves to penetrate the low-viscosity adhesive 32 into the layer 10. After activation, only the low-viscosity adhesive 32 is still operably involved in the adhesive bond.

Possible processing aids to render adhesives such as the low-viscosity adhesive 32 briefly non-tacky can be (Table 2):

| Designation | Type | Basis | Thickness/ particle size [μm] | Melting point, melting range [° C.] |
|---|---|---|---|---|
| Peka 23877 | film | polyolefin | 60 | 150 |
| Peka hot melt | film | EVA | / | 80 |
| abifor 1646 | powder | TPU basis | 0-125 | 62-68 |

Another embodiment can utilize a component 34 which instead of penetrating into the layer 10 forms a bond to the layer 10. Accordingly, when a suitable hot-melt adhesive film is used, pressure and heat 92 are exerted on the second side 302 of the bonding substance 30 such that this embodiment of the hot-melt adhesive film 34 forms a bond with the layer 10. The low-viscosity adhesive 32 in this case bonds only on the side 301 to the barrier layer 20.

FIG. 9 shows an exemplary process for producing a glove 50. The barrier layer 20 combines with an inner liner layer 22, facing the hand in use, to form an inner lining for the glove (inner glove 51, for example in the form of the inner glove of FIG. 4), while the layer 10 forms an outside layer for the glove (outside glove). The inner glove is initially disposed on a handform 200 (alternatively a hand of a person can also be inserted into the inner glove), the bonding substance 30 having been applied to the barrier layer 20 at partial locations. This process stage can be used for example to apply the hot-melt adhesive 34 in powder form to the low-viscosity adhesive 32 of the bonding substance 30 to switch off (block) the tackiness of the low-viscosity adhesive 32. Since the hot-melt adhesive 34 is not as yet activated, the outside glove is simple to slip over the inner glove without the outside glove becoming adhered to the inner glove at unwanted locations. Inconvenient and time-consuming inversion of the outside glove is not needed. When the outside glove and the inner glove are disposed in their respective final positions relative to each other, a heating device (a hot press for example) 210 can be used to activate the hot-melt adhesive 34, causing the inner glove to adhere to the outside glove at the locations where the bonding substance 30 is disposed. A thus produced glove 50 can then be removed from the handform 200.

FIGS. 10 and 11 show various possible embodiments of inner gloves for various applications. The purpose in each case is to provide a glove which has the best possible properties in the particular intended use. To this end, the bonding substances 30 are applied at strategically favorable locations in order that inter-slippage of the layers in use may be minimized. Adhesive bonding is sought to be minimized so as not to add stiffness.

For example, a strip-shaped bonding substance 30 can be disposed in each of the index finger region, middle finger region and knuckle region while the finger tip regions of the other fingers and of the thumb are adhered dotwise only. Another embodiment provides transversely disposed strip-shaped bonding substances 30 in the index finger region, while the finger tip regions of the other fingers and of the thumb are adhered dotwise only. The transverse arrangement in the finger and/or thumb region parallel to a bending line of the finger or thumb has a favorable effect on bending stiffness. Yet another embodiment provides transversely and/or longitudinally extending strip-shaped bonding substances 30 in the thumb and palm region, while the finger tip regions of the other fingers are adhered dotwise only.

In another embodiment, the bonding substance 30 is disposed in the finger region and the thumb region in strip form transversely to a bending line 62 of the glove. At the depicted exemplary bending line 62 in particular the corresponding finger is bent. This arrangement of fixing elements can enhance flexibility.

In another glove, the bonding substance 30 is distributed discontinuously in relatively large dots over the glove such that the bonding substance 30 occupies an area less than half of the glove inner area or glove outer area. This arrangement in conjunction with the large separations and the small adhered area makes it possible to achieve an ultimate inserted pad feeling coupled with good tactility.

The inner glove 51 of FIG. 10 is an exemplary illustration of how various geometric embodiments of bonding substances 30 can be combined to achieve certain properties and to prevent slippage of the inner glove with the barrier layer relative to the outside glove.

The present invention accordingly has made it possible to dispense with the attachment of reinforcing elements at the finger tips of the membrane, with which the finger tips are fixed to the outside glove by stitching. Instead, as depicted in FIGS. 11A and 11B, the finger tips of the membrane can be bonded to the outside glove by means of a bonding substance applied in relatively large dots, without any need for reinforcing elements of the membrane to be stitched to the outside glove with the outside glove in an inverted position. Such reinforcing elements are often embodied as textile tapes with hot-melt adhesive on the membrane side, but these textile tapes are not used as double-sided adhesive tapes but only serve for stitched attachment to the outside glove and hence for fixing the membrane by stitching to the outside glove.

The present invention is useful in the manufacture of other apparel pieces as well as gloves. Non-limiting examples of apparel pieces which can be equipped according to the present invention are for example head coverings such as caps and hats, and pants, jackets, vests, coats and also footwear.

The normal method of processing a head covering consists in stitching an inner lining with the barrier layer to the outside layer and, on the other side, to the inner liner. Again reinforcing elements have to be used for this. The present invention, then, provides an embodiment where the inner lining, consisting of a laminate with the barrier layer and the inner liner, is bonded to the outside layer by means of the bonding substance of the present invention.

FIG. 12 shows a schematic plan and side view of an embodiment of a head covering, which includes a layered structure of the present invention. The head covering 70 in the form of a cap includes an outside layer 71 to which the inner barrier layer (not visible) is secured dotwise, by means of the bonding substance 30, in a crest region 82 of the head covering 70 in order that minimal fixation may be achieved.

In a further embodiment, the bonding substance 30 is distributed in the form of a plurality of strips along the circumference of the head covering, in particular, in a plan view of the head covering, in a star-shaped pattern along the circumference.

In another embodiment, a further layer or a further material, for example foam material or insulating material, is integrated between the low-viscosity component and the further component of the bonding substance. This enhances the feeling of warmth or insulation when gripping. since the further material acts as a spacer. On gripping, the further material is compressed and thus does not impair the tactility of the glove.

The following experiment as shown in FIG. 13 was conducted to demonstrate the value of a powder processing aid in the manufacture of a glove. In FIG. 13, there is shown a manufacturing process without use of a processing aid (additional component 34) as mentioned above (FIG. 13A), and with use of a processing aid (additional component 34) (FIG. 13B).

According to FIG. 13A, at manufacturing a glove which comprises an outer layer 10 (e.g., comprising palm leather, backhand fabric), a barrier layer 20 and an inner fabric liner 22 forming an inner glove 51 (c.f., FIGS. 5, 6, and 9), in a first step, the liner 22 is bonded to the barrier layer 20 with use of an adhesive. To fix the inner glove 51 in the inner space of the outer layer 10 (outside glove), an adhesive 30 as described above, e.g. applied in the form of adhesive tapes, is placed on the outside of the inner glove 51. For example, the inner glove 51 is then placed over a worker's hand and then the outer layer 10 is pulled over the inner glove 51. When trying this, with the use of the described adhesive 30, as a matter of the tackiness of the adhesive 30 the inner glove 51 sticks with the adhesive 30 to the outer layer 10 before the inner glove 51 can be inserted into the inner space of the outer layer 10. Therefore the operation is very difficult and sometimes unsuccessful due to the tackiness of the adhesive from this invention.

On the other hand, FIG. 13B shows another manufacturing process with the use of an additional component 34 as mentioned above. Particularly, the tacky adhesive 30 is covered with an additional component 34, in the present example a hotmelt powder, to form a deactivated adhesive. The inner glove 51 is placed over worker's hand. Now the inner glove 51 can easily be placed inside the outer layer 10 as the tackiness of the adhesive 30 on the side facing the outer layer 10 is reduced. The deactivated adhesive on the inner glove 51 no longer sticks to the outer layer 10. Therefore, the inner glove 51 may be inserted into the outer layer 10 without sticking to the outer layer 10. After having inserted the inner glove 51 into the inner space of the outer layer 10, heat and pressure may be used for "deactivating" the hotmelt powder 34. With using heat and pressure from the inside and/or outside either the hotmelt powder 34 melts and penetrates in the outer layer 10, or through the increased viscosity of the tacky adhesive 30 the adhesive 30 penetrates through the powder 34. It can also be a complex mechanism of both phenomenons. As a result, the adhesive 30 now bonds to the inner side of the outer layer 10.

FIGS. 14 and 15 show exemplary embodiments of layer arrangements according to aspects of the invention with different amount of flexibility of the respective layer arrangement (in dependence of the arrangement of the adhesive). In the layer arrangement depicted in FIG. 14A, the barrier layer 20 is bonded to the outer layer 10, which is in the form of leather in the present example, by means of adhesive 30 applied over a continuous area between the barrier layer 20 and leather layer 10. On the other hand, in the layer arrangement depicted in FIG. 14B, the barrier layer 20 is bonded to the outer layer 10 by means of adhesive 30 which is not applied over a continuous area between the barrier layer 20 and leather layer 10. Rather, in a flex zone 64 of the glove, e.g. in the region of a bending line 63 of a finger or thumb, which may be any bending line at which a finger or thumb is bent, such as in the region of a fingertip or between palm and finger, there is no adhesive applied in order to increase the flexibility of the glove.

As shown in FIG. 15, the layer arrangement of FIG. 14B has a significantly reduced stiffness (shown on the right hand side of FIG. 15) as compared to the stiffness of the layer arrangement of FIG. 14A. For obtaining the results of FIG. 15, a testing method and apparatus has been used as follows:

Apparatus:

Thwing Albert Handle-O-Meter according to ASTM D6828 with 100 gram beam, 400 gram calibration weight, 40 gram calibration weight, 1000 gram beam.

Test Specimens:

1. Specimen size: 4"×4" as specified in the cutting instructions

2. Specimens per sample: Cut 3 warp and 3 fill

Conditioning: Condition the specimens at 70±2° F., 65±2% RH prior to testing.

FIG. 17 shows a test arrangement for testing the desirable creep capability described in this patent using a "T"-Peel Test of the adhesive component 32 when the adhesive 30 is applied between a barrier layer 20 and an outer layer 10 of an exemplary sample glove. The creep testing arrangement has been used under laboratory conditions of 20° C./65% humidity. Test specimens cut out of the garment piece have been used, wherein the specimens comprise two layers which are bonded together on approximately half of the specimen, as shown in the right hand picture of FIG. 17. Particularly, the bonded area, i.e. the area of the sample applied with the adhesive 30, comprises a length and width of 10 mm each. The test specimens or samples used for the testing can be cut out from a glove or garment piece, such as a glove 50 shown in FIG. 9.

As shown in FIG. 17A, one layer (in the present example, barrier layer 20) is fixed on a static frame with a clamp. A weight (in the present example 300 g) is fixed on the other layer (in the present example, outer layer 10). The weight has been applied slowly to avoid peak forces. As a result, the weight applies a defined force on the bonding area of the layer arrangement which results in detaching of one of the layers from the respective other layer. In FIG. 17A, it is schematically shown that via plastic flow (creep) of the adhesive component 32 the strain which the detaching force of the weight creates on the layer arrangement is distributed over a larger area of the layer surface. Over time, which also depends on the type of adhesive used in the layer arrangement, the location of the plastic flow (creep) migrates as the layers are separating from one another, as shown in FIG. 17B from the start of the test until the layers are completely separated (after failure), while the plastic flow (creep) threads tear or break over time as the layers are separating and moving away from one another, as shown.

Results of a testing method according to the principles as explained with reference to FIG. 17 are shown in the table of FIG. 18 for the different types of adhesive, as also mentioned above in Table 1.

Additionally, FIG. 18 shows the behaviour of an adhesive Peka 23877 being a hotmelt based on polyolefin which does not comprise the behaviour as the other types listed in the table. Rather, the adhesive is quickly released from one substrate or damages the substrate as it does not have the plastic flow capability as the other adhesives listed in the table.

According to FIG. 18, the time to failure in seconds is specified for the respective used type of adhesive and its shear modulus.

In one embodiment of a bonding substance according to the invention the time to failure is in a range from 5 s to 24 hours.

In another embodiment of a bonding substance according to the invention the time to failure is in a range from 10 s to 10 hours.

In another embodiment of a bonding substance according to the invention the time to failure is in a range from 20 s to 5 hours.

The invention claimed is:

1. A layered structure, comprising:
a first layer; and
a second layer including:
at least one barrier layer which is water vapor permeable and liquid impermeable, and
a bonding substance disposed between the at least one barrier layer and the first layer to create a bond between the at least one barrier layer and the first layer,
wherein the bonding substance includes:
at least one first component of low viscosity such that a force between the first and second layers which acts on at least one of the layers in a force action area (A1) is distributed by a plastic flow onto an area (A2) which is larger than the force action area (A1), said at least one first component having a first activation energy; and
a second component having a second activation energy, the second activation energy being different than the first activation energy;
wherein the bonding substance is partially disposed between the at least one barrier layer and the first layer such that the bonding substance is distributed unevenly by being disposed only at a plurality of locations on the surface area of at least one of the first and second layers at concentrated, discrete points and by being absent from other coherent regions of the surface area, and wherein the bonding substance does not cover the entire surface area of the at least one of the first and second layers, and wherein the at least one first component is configured to have, at 25° C., a shear modulus of not more than $3 \times 10^5$ Pa in accordance with the Dahlquist criterion.

2. The layered structure according to claim 1 wherein the second component has an adhesion property which differs from the at least one first component.

3. The layered structure according to claim 1 wherein the at least one first component of the bonding substance is a pressure sensitive adhesive component.

4. The layered structure according to claim 3 wherein the pressure sensitive adhesive component comprises an acrylate adhesive.

5. The layered structure according to claim 1 wherein the second component is a hot-melt adhesive.

6. The layered structure according to claim 1 wherein the at least one first component forms a bond with the at least one barrier layer and wherein the second component forms a bond with the first layer.

7. The layered structure according to claim 6 wherein the second component comprises a hot-melt adhesive or a wax.

8. The layered structure according to claim 1 wherein the at least one first component forms the bond with the at least one barrier layer and the first layer, and wherein the second component penetrates into at least one of the at least one component and the first layer.

9. The layered structure according to claim 1 wherein the at least one barrier layer forms an outside layer of the second layer, said second layer facing the first layer.

10. The layered structure according to claim 1 wherein the at least one barrier layer is gas impermeable.

11. The layered structure according to claim 1 wherein the at least one barrier layer is air impermeable.

12. The layered structure according to claim 1 wherein the layered structure is an apparel piece.

13. The layered structure according to claim 12 wherein the first layer is an outside layer and the second layer is part of an inner layer of the apparel piece.

14. The layered structure according to claim 12 wherein the layered structure is configured as a glove or as a head covering.

15. The layered structure of claim 1, wherein the at least one first component is a pressure sensitive adhesive component and said second component is a heat sensitive component.

16. The layered structure of claim 1, wherein said bonding substance is positioned between said first layer and said at least one barrier layer such that said at least one first component is positioned adjacent to said at least one barrier layer and said second component is positioned adjacent to said first layer.

17. A glove comprising:
a layered structure comprising:
  a first layer; and
  a second layer including:
    at least one barrier layer which is water vapor permeable and liquid impermeable, and
    a bonding substance disposed between the at least one barrier layer and the first layer to create a bond between the at least one barrier layer and the first layer,
    wherein the bonding substance includes:
      at least one first component of low viscosity such that a force between the first and second layers which acts on at least one of the layers in a force action area (A1) is distributed by a plastic flow onto an area (A2) which is larger than the force action area (A1), said at least one first component having a first activation energy; and
      a second component having a second activation energy;
    wherein the bonding substance is partially disposed between the at least one barrier layer and the first layer such that the bonding substance is distributed unevenly by being disposed only at a plurality of locations on the surface area of at least one of the first and second layers at concentrated, discrete points and by being absent from other coherent regions of the surface area, and wherein the bonding substance does not cover the entire surface area of the at least one of the first and second layers, and wherein the at least one first component is configured to have, at 25° C., a shear modulus of not more than $3\times10^5$ Pa in accordance with the Dahlquist criterion.

18. The glove according to claim 17 wherein the first layer is an outside layer of the glove and the second layer is an inner lining of the glove.

19. The glove according to claim 17 wherein the first layer is an inner lining layer of the glove and the second layer is an outside layer of the glove.

20. The glove according to claim 17 wherein the first layer and the second layer are each part of an inner lining of the glove.

21. The glove according to claim 17 wherein the glove includes a finger region and a thumb region and the bonding substance is disposed at least in the finger region and in the thumb region.

22. The glove according to claim 21 further comprising a slip-impeding substance disposed between the first layer and the second layer in at least one further region of the glove.

23. The glove according to claim 21 wherein the bonding substance is further disposed in a hand area region.

24. The glove of claim 23, wherein the bonding substance is further disposed in a knuckle region of the glove.

25. The glove of claim 21, wherein the glove includes a finger region and a thumb region, wherein the finger region includes one or more finger tips and the thumb region includes a thumb tip, and the bonding substance is disposed in said one or more finger tips and in the thumb tip.

26. The glove according to claim 17 wherein the bonding substance is discontinuously distributed throughout the glove.

* * * * *